(12) United States Patent
Moore et al.

(10) Patent No.: US 10,987,860 B2
(45) Date of Patent: Apr. 27, 2021

(54) SYSTEMS AND METHODS FOR IMPLEMENTING THREE DIMENSIONAL (3D) OBJECT, PART AND COMPONENT MANUFACTURE INCLUDING DISPLACEMENT/VIBRATION WELDED OR HEAT STAKED LAMINATES

(71) Applicant: XEROX CORPORATION, Norwalk, CT (US)

(72) Inventors: Steven R. Moore, Pittsford, NY (US); Abu Saeed Islam, Rochester, NY (US); Bruce H. Smith, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 288 days.

(21) Appl. No.: 15/994,238

(22) Filed: May 31, 2018

(65) Prior Publication Data
US 2018/0272685 A1    Sep. 27, 2018

Related U.S. Application Data

(62) Division of application No. 14/949,908, filed on Nov. 24, 2015, now Pat. No. 10,046,547.

(51) Int. Cl.
*B32B 37/00* (2006.01)
*B29C 64/147* (2017.01)
(Continued)

(52) U.S. Cl.
CPC .......... *B29C 64/147* (2017.08); *B29C 64/188* (2017.08); *B29C 64/205* (2017.08); *B32B 37/06* (2013.01); *B32B 37/14* (2013.01); *B32B 38/0004* (2013.01); *B32B 38/0012* (2013.01); *B29C 65/06* (2013.01); *B29C 65/606* (2013.01); *B29C 66/1122* (2013.01); *B29C 66/21* (2013.01);
(Continued)

(58) Field of Classification Search
USPC ...................................................... 156/73.5
See application file for complete search history.

(56) References Cited

U.S. PATENT DOCUMENTS 6,450,393 B1 * 9/2002 Doumanidis ..... B29C 66/81433
228/110.1
6,457,629 B1   10/2002  White
(Continued)

FOREIGN PATENT DOCUMENTS

WO    WO 2014/134224    9/2014

*Primary Examiner* — James D Sells
(74) *Attorney, Agent, or Firm* — Caesar Rivise, PC

(57) ABSTRACT

A system and method are provided for implementing relatively low temperature joining processes, including displacement/vibration welding techniques and/or heat staking techniques, in a process of building up laminate layers to form and/or manufacture three-dimensional objects, parts and components in additive material (AM) manufacturing systems. A multi-stage 3D object forming scheme is described involving steps of laminate cutting (with lasers or other cutting devices); laminate transport between processing stations (including using one or more of conveyors, robotic pick and place devices and the like); laminate stacking, clamping and adhering through comparatively low temperature welding or other mechanical joining (including displacement/vibration welding or heat staking); and mechanical surface finishing (via CNC machining or other comparable process).

20 Claims, 8 Drawing Sheets

(51) Int. Cl.
*B29C 64/205* (2017.01)
*B29C 64/188* (2017.01)
*B32B 37/06* (2006.01)
*B32B 37/14* (2006.01)
*B32B 38/00* (2006.01)
B29C 65/00 (2006.01)
B32B 37/04 (2006.01)
B29C 65/06 (2006.01)
B29C 65/60 (2006.01)
B33Y 10/00 (2015.01)
B33Y 30/00 (2015.01)

(52) U.S. Cl.
CPC .......... *B29C 66/3022* (2013.01); *B29C 66/45* (2013.01); *B29C 66/73921* (2013.01); *B32B 37/04* (2013.01); *B33Y 10/00* (2014.12); *B33Y 30/00* (2014.12)

(56) References Cited

U.S. PATENT DOCUMENTS

| | | |
|---|---|---|
| 6,575,218 B1 | 6/2003 | Burns et al. |
| 6,814,823 B1 | 11/2004 | White |
| 9,908,292 B2 | 3/2018 | Moore et al. |
| 2005/0161146 A1 | 7/2005 | Graf |

\* cited by examiner

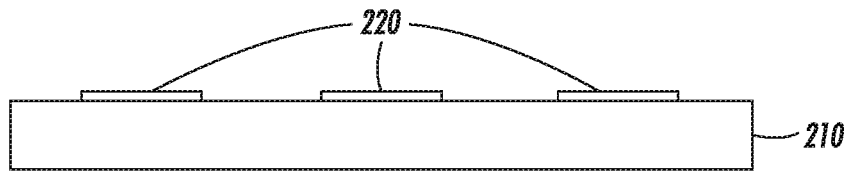
FIG. 2A
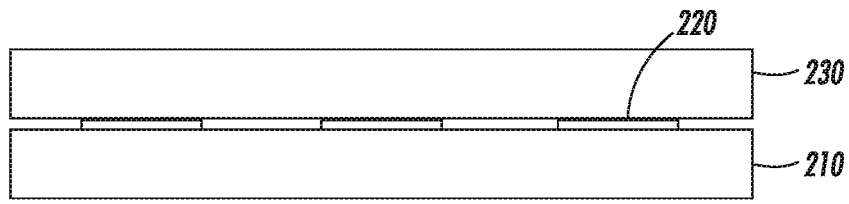
FIG. 2B
FIG. 2C
FIG. 2D

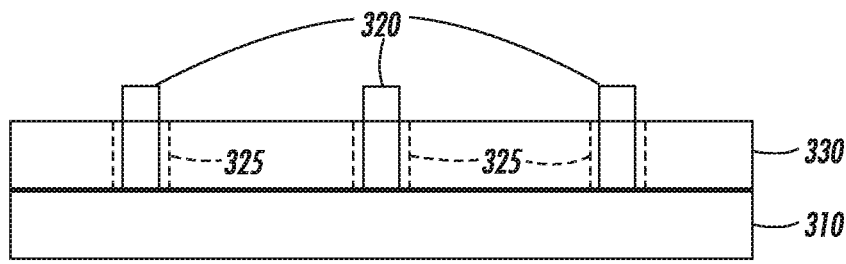
FIG. 3A
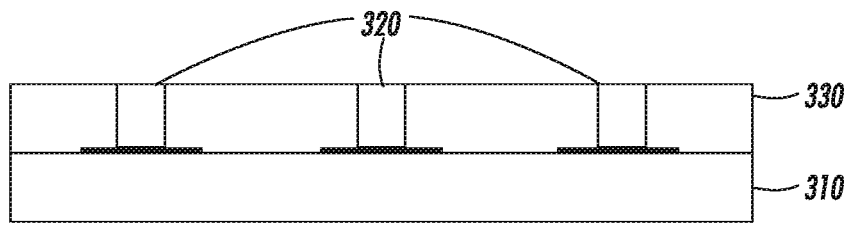
FIG. 3B
FIG. 3C
FIG. 3D

SYSTEMS AND METHODS FOR IMPLEMENTING THREE DIMENSIONAL (3D) OBJECT, PART AND COMPONENT MANUFACTURE INCLUDING DISPLACEMENT/VIBRATION WELDED OR HEAT STAKED LAMINATES

BACKGROUND

This application is related to U.S. Pat. No. 9,908,292, entitled "SYSTEMS AND METHODS FOR IMPLEMENTING THREE DIMENSIONAL (3D) OBJECT, PART AND COMPONENT MANUFACTURE INCLUDING LOCALLY LASER WELDED LAMINATES," filed in the U.S. Patent and Trademark Office on a same day as the filing date of this application, and co-owned with this application, the disclosure of which is hereby incorporated by reference herein in its entirety.

1. Field of the Disclosed Embodiments

This disclosure relates to systems and methods for implementing relatively low temperature joining processes, including displacement/vibration welding techniques and/or heat staking techniques, in a process of building up laminate layers to form and/or manufacture three-dimensional objects, parts and components (3D objects).

2. Related Art

In recent years, traditional object, part and component manufacturing processes, which generally included varying forms of molding or machining of output products, have expanded to include a new class of techniques globally referred to as "additive material" or AM manufacturing techniques. These techniques, as currently implemented, generally involve processes in which layers of additive material, sometimes toxic or otherwise hazardous in an unfinished state, are sequentially deposited on the in-process 3D object according to a particular material deposition and curing scheme. As each layer is added in the 3D object forming process, the new layer of deposited material is added and adhered to the one or more already existing layers. Each AM layer may then be individually cured, at least partially, prior to deposition of any next AM layer in the 3D object build process.

AM manufacturing techniques include, but are not limited to, those techniques that have come to be referred to broadly as "3D printing" techniques usable for producing 3D printed parts. 3D printing techniques employ one or more processes that are adapted from, and appear in many respects to be similar to, well-known processes for forming two-dimensional (2D) printed images on image receiving media substrates. The significant differences in the output structures produced by the 3D printing techniques are generally based on (1) a composition of the deposited materials that are used to form the output 3D printed parts from the 3D printer; and (2) a number of passes made by the "print" heads in depositing comparatively large numbers of successive (and very thin) layers of the deposition material to build up the layers to the form of the output 3D printed parts.

In sophisticated AM manufacturing systems, including complex 3D printers, an ability of the deposition system or printing apparatus to translate among multiple axes such as, for example, at the end of a robotic arm, provides a capacity for the AM manufacturing system or 3D printer to produce increasingly intricate 3D objects of virtually any shape according to computer control in the copying of a 3D model, and/or in translating 3D modeling or object forming information to a detailed digital data source file.

An expanding number of AM manufacturing or 3D printing processes and techniques are now available. Principal distinguishing characteristic between the multiplicity of these AM manufacturing or 3D printing processes are in the manner in which the layers are deposited to create the output 3D objects, and in the materials that are used to form the output 3D objects.

Certain of the AM manufacturing techniques (as this term will be used throughout the balance of this disclosure to refer to various 3D object layering and build techniques including 3D printing) melt or soften materials to produce the build layers using techniques such as, for example, selective laser melting or sintering of an input material. Others of the AM manufacturing techniques deposit and cure liquid materials using technologies for the deposition of those liquid materials such as jetted (ink) material "printing" techniques.

Difficulties arise with the typical material deposition techniques as they are adapted for AM manufacturing. An amount of solid material to be deposited in either of a material extrusion, material jetting or other like deposition process must be limited in order that the deposition material can pass through the particularly-configured material deposition nozzles without clogging those nozzles during the AM deposition process. As a result, very thin layers of material are deposited on each pass of the deposition system across, or around, the already deposited layers forming the in-process 3D object. This limitation of depositing very thin material layers, often combined with a need to cure each deposited layer before depositing any next layer, limits a build speed for the 3D object in the conventional AM manufacturing processes, tending to make the processes very tedious and only economical or efficient enough for employment in producing limited runs of particularized 3D objects.

AM manufacturing techniques thus exhibit advantages over conventional part manufacturing techniques, including molding or machining, in that the intricacy in a finished part. AM manufacturing techniques additionally promote certain flexibility in a color gamut in the available materials when the AM manufactured 3D objects are intended to advantageously present particular color schemes thereby avoiding some after-object-formation additional finishing steps. In 3D printing techniques, for example, the ink-like materials are capable of using multiple materials, which may be of differing colors, in the course of printing, or otherwise forming, the output 3D printed parts. The capacity of these techniques to print in multiple colors and color combinations simultaneously to produce output 3D printed parts generally eliminates additional object painting/finishing. AM manufacturing systems and devices, in general, can undertake material deposition with a broad spectrum of different materials as well. These materials include, for example, extruded plastics and thermoplastics, high-density polyethylenes, certain metals (including sintered metals, metal powders and/or metal alloys), glued powder mixtures, ceramic materials and ceramic matrix composites, modeling clays, plasters and certain ink-like materials, including photo curable and/or ultraviolet (UV) light curable inks with high concentrations of solid components suspended in solution. 3D printers can even be used to deposit layers of compositions of edible materials for producing foodstuffs in the culinary arts.

Unfortunately, the advantages in these AM manufacturing systems and schemes are currently balanced by the distinct disadvantages of time to build and cure among others, making these AM manufacturing techniques less acceptable in certain, and particularly mass production, 3D object forming scenarios.

SUMMARY

Existing AM manufacturing techniques include those generally referred to as Fused Deposition Modelling (FDM) and Multi-Jet Modelling (MJM). As indicated above, these techniques are being increasingly adopted for prototyping and short run manufacturing of 3D objects. AM material manufacturing techniques like FDM are, for example, capable of building 3D objects from many different common thermoplastic resins that are extrudable. AM manufacturing techniques like MJM are, for example, capable of building 3D objects by depositing additive materials, including the same thermoplastic resins and other solids components, suspended in pigmented and unpigmented ink-like solutions. The 3D object is tediously built up layer-by-layer by deposition of extruded resin droplets in FDM, or otherwise according to the deposition of jetted material droplets in MJM. As industrial and other applications emerge that attempt to capitalize on the flexibility incumbent in the application of these AM manufacturing technologies, the build speed available with these technologies remains unacceptably, or some would say painfully, slow. As noted above, these slow rates with which very thin layers of droplets of materials are deposited are often compounded by a need to at least individually partially cure each layer in the 3D object build process prior to depositing a next layer to be adhered to the previously-deposited and partially-cured underlayers.

Another drawback is that the conventionally-manufactured AM 3D objects may generally bear little resemblance to a part manufactured, for example, in an injection molding process, because there may be significantly more porosity in the materials and the material build process, rendering a less dense part from one that may have been molded or machined. The AM manufactured 3D objects are thus generally not as strong as their otherwise manufactured, molded or machined counterparts.

The advantage remains, however, that AM manufactured 3D objects can be formed in shapes that may be very difficult to otherwise render in, for example, a molding or machining manufacture process. Still, these intricacies present challenges in the implementation of the AM manufacturing processes. Consider, for example, flanges that may be formed in an AM manufacturing process in a manner that newly added portions shadow portions of the underlying manufactured part from exposure to a curing mechanism. Typically too, if there exists an overlying feature that would be supported only below it by, for example, air, some manner of support structure often in the form of a second support material, or sacrificial feature formed of a waste material, may be delivered/provided, to hold the overlying structure up in space during the 3D object build process. This is a further known restriction in the conventional layer-by-layer AM manufacturing build process.

In view of the above shortfalls, it would be advantageous to develop an advanced AM manufacturing process that allows use of well-known base materials, similar design flexibility to current material deposition techniques, and much higher build rates. It would be further advantageous to reduce, or substantially eliminate, additional support structure material inclusion requirements as waste in the build process.

Exemplary embodiments of the systems and methods according to this disclosure may provide advanced AM manufacturing techniques that address the above shortfalls in the conventional AM manufacturing techniques producing significantly increased build rates, overcoming porosity (strength) concerns in the rendered parts and mitigating a requirement for sacrificial support structures over comparable currently-available AM manufacturing techniques and technologies for 3D object forming.

Exemplary embodiments may provide schemes for creating finished 3D objects by cutting a series of pre-programmed 2D slices (laminates), each thicker and strong enough in its own right, from one or more flat sheets of input material. Each sheet of input material may be comparatively significantly thicker than any individually-produced layer employing an FDM or MJM deposition process. As such, each 2D slice can be prepared faster and have a greater thickness than a corresponding FDM or MJM produced layer, with no requirement for individual layer curing as each 2D slice is itself formed of a substantially finished material.

In many current employment scenarios, the deposited materials, in an uncured state, may be environmentally hazardous, or otherwise may present hazards to user personnel handling in-process 3D objects during a forming process in which the 3D objects are not yet "finished" in a final curing process. Exemplary embodiments may reduce environmental hazards that arise in certain deposition and curing processes by limiting exposure to uncured hazardous materials employed to effect a deposition process and byproduct issues that may arise in the curing of those materials. Exemplary embodiments may also substantially reduce handling hazards to users that may arise from the handling of any less-than-fully-cured surfaces of unfinished 3D objects because each 2D slice is, of itself, formed of a "finished" material. Put another way, the materials from which individual 2D slices, as the additive layers, may be cut are themselves stable, non-hazardous materials. Exemplary embodiments may provide input material sheets that may be in a form of one or more of common thermoplastics, metals, and the like.

In embodiments, a set of 2D slices (laminates) may be first cut from the input material sheet(s) according to a stack-wise varying template for the shape and configuration of the 2D slice at any level in the in-process 3D object build. The set of 2D slices may be cut to an approximate over-shape for the build of each layer.

In embodiments, each successive 2D slice may then be located, clamped, and adhered onto a previous 2D slice in the stack of 2D slices at the top (or otherwise outside) of the in-process 3D object build stack or structure. In this manner, a 3D volume approximating a finished 3D object may be created from the build-up (or build out) of 2D slices stacked and successively adhered to one another.

In embodiments, the near net shape 3D volume comprised of the complete set of stacked and adhered 2D slices or laminate layers may then be refined to a final finished (volumetric) geometry for the 3D object by machining off the limited excess material using one or more common surface shaping techniques, including for example a multi-axis Computer Numerical Control (CNC) milling machine or cutter. This refining process is intended to result in less waste of material than if there were any required emplacement of sacrificial waste support materials, as is generally required in any complex 3D object build employing FDM, MJM or other comparable conventional AM manufacturing technique.

Exemplary embodiments may employ comparatively low temperature processes for adhering each 2D slice in succession to underlayers already present in the AM manufacturing 3D object build process. These comparatively low temperature adhering processes may include, for example, displacement/vibration welding techniques and/or heat staking techniques to adhere one 2D slice to an underlying material layer.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing relatively low temperature joining processes, including displacement/vibration welding techniques and/or heat staking techniques, in a process of building up laminate layers to form and/or manufacture AM manufactured 3D objects, according to this disclosure, will be described, in detail, with reference to the following drawings, in which:

FIGS. 2A-2D illustrate an exemplary embodiment of a layer to layer overview for describing a displacement/vibration welding technique usable in an AM manufacturing scheme according to this disclosure;

FIGS. 3A-3D illustrate an exemplary embodiment of a layer to layer overview for describing a heat staking technique usable in an AM manufacturing scheme according to this disclosure;

DETAILED DESCRIPTION OF EMBODIMENTS

Figure 1:
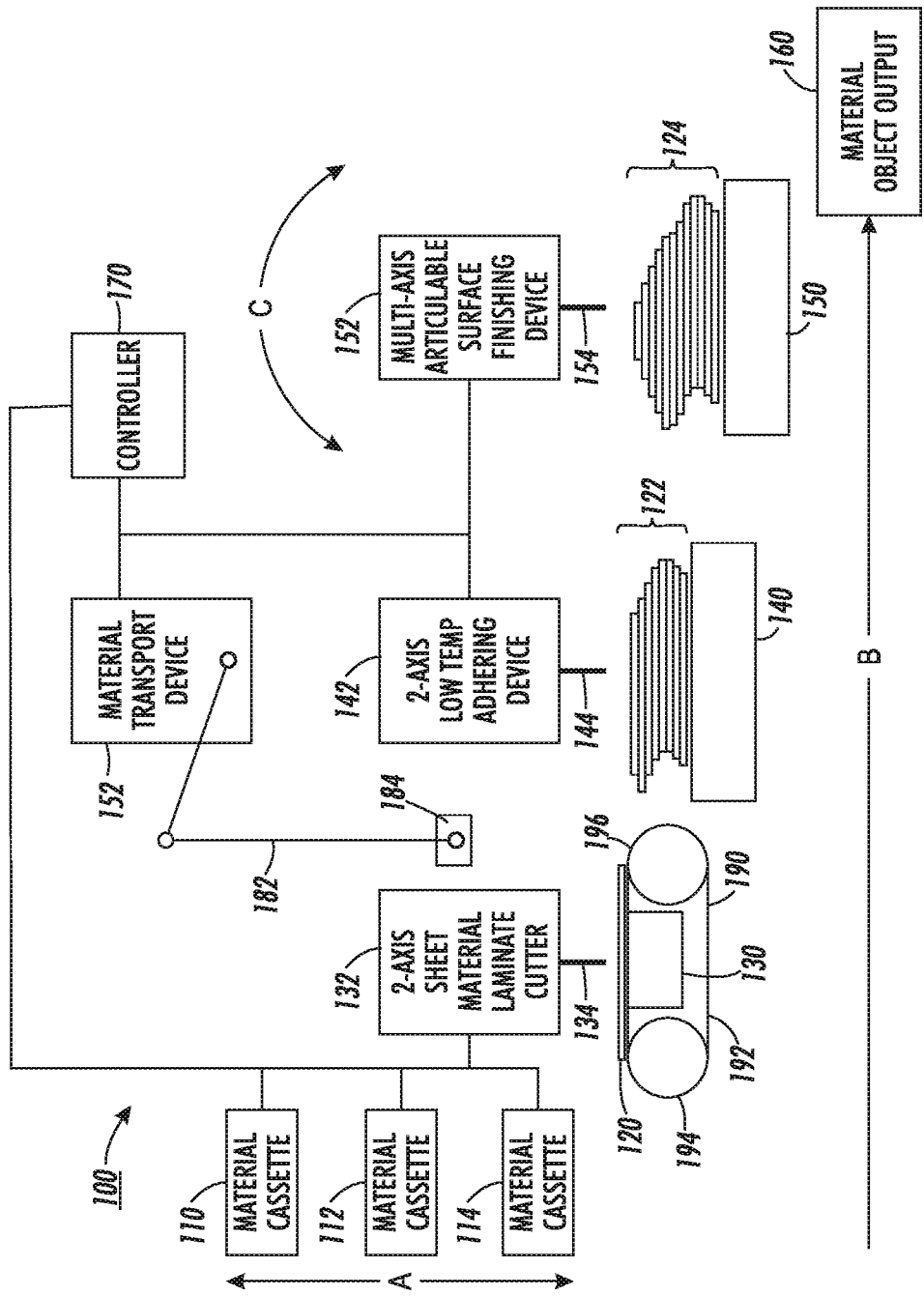
FIG. 1 illustrates a schematic diagram of an exemplary AM manufacturing 3D object forming system according to this disclosure.

The systems and methods for implementing relatively low temperature joining processes, including displacement/vibration welding techniques and/or heat staking techniques, in a process of building up laminate layers to form and/or manufacture AM manufactured 3D objects according to this disclosure will generally refer to these specific utilities for those systems and methods. Exemplary embodiments described and depicted in this disclosure should not be interpreted as being specifically limited to any particular configuration of (1) an AM manufacturing 3D object forming system or components thereof, (2) individual input materials delivered in sheet form at an input of the AM manufacturing system from which the disclosed 2D slices may be cut, or (3) control and/or processing components for controlling an AM manufacturing process for 3D object forming within the AM manufacturing system. It should be recognized that any advantageous use of schemes for applying addressable and/or selective discrete layer-to-layer adhering of AM layers in a form of cut 2D slices to portions of an in-process 3D object employing devices and methods such as those discussed in detail in this disclosure is contemplated as being included within the scope of the disclosed exemplary systems and methods.

The disclosed systems and methods will be described as being particularly adaptable to use for implementing AM manufacturing by presenting one or more input materials in sheet form at an input of the AM manufacturing process. The input materials in sheet form, although described as having 2D slices cut from them, are recognized as having a particular thickness in the third (height) dimension that is significantly greater than any layer of material deposited in an FDM, MJM or other like deposition process would render. Current FDM and MJM techniques render a 3D object in a set of comparatively exceptionally thin layers. Each layer according to these conventional processes may be on the order of a fraction of a millimeter thick based on the deposition material that the selected process supports. An advantage of the disclosed schemes is that the 3D object is rendered into much thicker layers, on the order of 1 to 5 millimeters each, cut from input sheets of pre-finished materials. Multiple input materials, and potentially variations in the 2D slice layer thicknesses, may be employed in the forming of a single 3D object according to the disclosed AM manufacturing schemes.

Further, although reference may be made to sheets being formed of certain input materials such as common thermoplastics, metals, and the like, these references are intended to be illustrative of exemplary materials that could be employed in the disclosed AM manufacturing schemes. These references should not be considered as limiting the disclosed systems and methods to any particular set or class of input materials other than that they may be presentable in sheet form at an input of the disclosed systems. Generic reference will be made to output 3D objects in order that this disclosure is not interpreted as being particularly limited to any AM manufacturing techniques for producing a particular output 3D object.

The disclosed embodiments are intended, among other objectives, to provide a comparatively faster build rate for production of 3D objects formed in an AM manufacturing process, addressing a challenge that many conventional AM manufacturing routinely encounter, thereby limiting their efficiency, and therefore resultant effectiveness. Removal of a requirement for any in-process curing step will tend to (1) further increase the manufacturing build rate available in the disclosed schemes and (2) mitigate concerns, for example, that any in-process curing may be thorough enough to effectively cure all components to reduce material handling hazards associated with the 3D objects without over-curing, and thereby causing damage to, the in-process 3-D objects.

FIG. 1 illustrates a schematic diagram of an exemplary AM manufacturing 3D object forming system 100 according to this disclosure. As shown in FIG. 1, the exemplary system 100 may include one or more material cassettes 110, 112, 114 holding input materials in a sheet form as material input sources for the exemplary system 100. One or more of the material cassettes 110, 112, 114 may include stacks or rolls of sheets of input material. The one or more material cassettes 110, 112, 114 may be translatable in a vertical direction A to accommodate delivery of the input material sheets to the exemplary system 100 in the manner shown.

The input materials, in a sheet form, may include common thermoplastics, metals and other like sheeted materials.

An individual sheet of input material 120 may be transported from one of the material cassettes 110, 112, 114 to a first processing station that constitutes a 2D slice or laminate creation zone in the exemplary system 100. Transport of the individual sheet of input material may be via a conveyor transport system 190 or other comparable transport system. The conveyor transport system 190 may comprise a series of conveyor rollers 194, 196 about which a conveyor belt 192 is made to circulate. The laminate creation zone of the exemplary system 100 may include a material cutting support base 130 opposite, for example, a 2-axis sheet material laminate cutter 132. The laminate cutter 132 may be in a form of a laser cutter emitting a laser beam 134, or may be in a form of another physical material cutter including a mechanical milling type cutter, a waterjet cutter or other known cutting device that is typically used to cut laminate components from a sheet of material.

Under control of a processor or controller 170, a set of 2D slices (laminates) may be cut from the material sheets 120 in the laminate creation zone. The controller 170 may be provided with 3D object forming data that is devolved, or parsed, into component data to execute a controllable process in which individual 2D slices are cut from sheet(s) of input material 120 by the laminate cutter 132. The individual 2D slice templates, in plan form, may be slightly oversized to the finished outer volume of the in-process 3D object at the level of that individual 2D slice layer in the 3D object build process. For many interesting and/or complex parts, the disclosed schemes may separately, accurately, and robustly pre-form the essentially-finished 2D slices to be separately joined together to render the 3D object.

The cut sheet component or 2D slice may then be transported via any known material transport mechanism in direction B from the laminate creation zone to a second processing station constituting an object build zone in the exemplary system 100. The known material transport system may be a same or a separate conveyor component, in the form of the conveyor transport system 190. The known material transport system may be a material transport device 180, in a form of a robotic pick and place device, including a manipulable (and potentially articulated) robotic arm 182 with a material holding device 184 at a distal end of the robotic arm 182. The known material transport system may be a combination of such devices or may include other like known components, units or devices for 2D slice transport between processing stations.

The object build zone may include, for example, a build platform 140 opposite a 2-axis low temp adhering device 142. In the object build zone, an individual next 2D slice transported from the lamination creation zone may be first placed on the build platform 140 or may be added to an underlying processed stack or body of other 2D slices on the build platform 140 to build up the in-process 3D object. The build platform 140 may be in the form of some movable platform for raising and lowering in-process 3D object as a stack of 2D slices 122 in direction A to support the stacking and adhering process in the object build zone.

Prior to placing the next 2D slice on the underlying processed stack of other 2D slices on the build platform 140, a surface of the top 2D slice in the underlying processed stack may be surface prepared to accept the next 2D slice. The surface preparation may include printing of certain energy directors, or an array of bosses, as an output stream of material 144 from the 2-axis low temp adhering device 142. The surface preparation and adhering processes according to this disclosure will be described in greater detail below with reference to FIGS. 2 and 3, illustrating and describing each one of a displacement/vibration welding process and a heat-staking process for attachment of the next 2D slice to the in-process 3D object on the build platform 140. Once the surface of the top 2D slice is surface prepared according to one or more of the adhering techniques, the next 2D slice may be placed on the stack, and clamped to the stack in a manner that supports one or more of the displacement/vibration welding and the heat-staking adhering processes according to this disclosure.

When the near net volume of the in-process 3D object is complete with the placing and adhering of the last 2D slice, the near net volume 3D object may then be transported via any known material transport mechanism in direction B from the object build zone to a third processing station constituting an object surface finishing zone in the exemplary system 100. The object surface finishing zone may include, for example, a finishing platform 150 opposite a multi-axis articulated surface finishing device 152. The multi-axis articulated surface finishing device 152 may be, for example, a six axis CNC milling machine with a milling bit 154 for creating a final 3D object shape in a minimally subtractive machining process, or other like machining device. The surface finishing device may be movable in directions A, B and/or C in cooperation with movement of the finishing platform in directions A and B, each controlled by inputs from the controller 170, to surface finish the 3D object before outputting the finished 3D object to a material object output 160. The object surface finishing may operate on a completed stack of 2D slices on the finishing platform 150 in a finishing process that reduces an outer mold line of the stack of 2D slices, which represents a slightly oversized version of the final 3D object, to the final outer mold line of the manufactured 3D object.

Those of skill in the art will recognize that there may be some complex shapes, or complex component parts, for a manufactured 3D object that may not be able to be fashioned according to the above scheme. For those parts that may lend themselves to the above process, however, this process can be undertaken at a much higher rate based on individual laminate 2D slice thicknesses that may be ten or more times the thickness of each layer of an AM manufacturing substance deposited in, for example, an extruded or a jetted material manner. A particular objective, therefore, addressed by the disclosed schemes is generation of 3D objects in an AM manufacturing process faster. The disclosed schemes are directed at expediting a vertical (or an outward) growth rate of the AM manufactured component to render a stronger 3D object that is much quicker to make.

In the above-described manner, the disclosed AM manufacturing schemes are generally comprised of a combination of additive and subtractive material manufacturing technologies. The disclosed AM manufacturing schemes are intended to form a final 3D object that is more materially sound, stronger and/or more robust than the similar 3D components that are formed by, for example, FDM, MJM and other like 3D object forming processes. Any weaknesses in the formed 3D objects will not be within the layers themselves, but may rather appear only between the 2D slice layers where the individual 2D slices are affixed, adhered, or otherwise mated to one another. Based on the strength of the individual 2D slices, concentration for strength of manufacturing in the disclosed schemes is directed at the layer-to-layer adhering processes.

FIGS. 2A-2D illustrate an exemplary embodiment of a layer to layer overview for describing a displacement/ vibration welding technique usable in an AM manufacturing scheme according to this disclosure. As shown in FIG. 2A, a topmost or outermost 2D slice 210 in the build process may be provided. As is described generally above, it is recognized that each 2D slice in the disclosed 3D object build process may have an arbitrary shape with respect to each other 2D slice in the build process. Depending on the material thickness of the input material from which the each 2D slice is cut, each 2D slice may have a variable, but predefined, thickness. FIG. 2B shows that, in support of the displacement/vibration welding process, energy director features 220 may be selectively printed, according to known print methods (potentially including FDM and/or MJM), or otherwise deposited/formed on a top surface of the 2D slice 210. Energy director features 220 may consist of "beads" of deposited material or discrete regions of deposited material. In a case in which the 2D slices 210 consist of a thermoplastic material, the deposited energy director features 220 may be comprised of essentially a thermoplastic material discretely deposited in small portions on the top of the 2D slice 210. FIG. 2C shows a next 2D slice 230 placed in position (and optionally clamped to) the energy-director printed 2D slice 210. Once the two 2D slices (laminates) 210,230 and the energy director features 220 are in place, the assembly as shown in FIG. 2C may be displacement and/or vibration welded in a conventional manner. During the displacement and/or vibration welding process, the energy director features 220 are made to collapse in a process that bonds the two 2D slices 210,230 together. See FIG. 2D. Wherever the energy director features 220 are present, the 2D slices 210,230 are locally heated sufficiently to create a weld joint. At the end of this process, the two 2D slices are now joined into an inseparable assembly.

A characteristic of the displacement/vibration welding (or joining) process is that the temperature rise at the interface during welding is below the melting point of the material layer. The joining temperature may be low and localized typically confined to a region 5 to 200 microns thick. Rapid heat dissipation from the region of bonding ensures that minimal residual stresses arise. As such, post-processing to relieve residual stresses is typically not necessary. Similarly, a liquid-solid phase transformation is avoided, and the final product has improved dimensional accuracy and resistance to fatigue and cracking. Due to the low-temperature nature of displacement/vibration welding process, energy costs are significantly less than in competing technologies.

FIG. 3A-3D illustrate an exemplary embodiment of a layer to layer overview for describing a heat staking technique usable in an AM manufacturing scheme according to this disclosure. As shown in FIG. 3A, a topmost or outermost 2D slice 310 in the build process may be provided. As is described generally above, it is recognized that each 2D slice in the disclosed 3D object build process may have an arbitrary shape with respect to each other 2D slice in the build process. Depending on the material thickness of the input material from which the each 2D slice is cut, each 2D slice may have a variable, but predefined, thickness. FIG. 3B shows that, in support of the heat staking joining process, a plurality of bosses 320 may be selectively printed, according to known print methods (potentially including FDM and/or MJM), or otherwise deposited/formed on a top surface of the 2D slice 310. In a case in which the 2D slice 310 consists of a thermoplastic material, the plurality of bosses 320 may be comprised of a deposited material of essentially a same thermoplastic material deposited in material structures on the top of the 2D slice 310. The plurality of bosses 320 may be formed to be taller than a thickness of a next 2D slice 330 in which additional complementary boss-accommodating through features 325 may be cut. These through features 325 may be a series of holes or slots that are particularly arranged to provide clearance to the plurality of bosses 320 created on the 2D slice 310, which will, by the nature of the joining and adhering process, include previously-collapsed bosses. FIG. 3B thus illustrates a formed assembly prepared for the joining process. Each one of the plurality of bosses 320 on 2D slice 310, and protruding through the accommodating through features 325 of the newly-placed 2D slice, may then be staked using a conventional heat stake head. See FIG. 3C. At the end of this process, the two laminates are now joined into an inseparable assembly with the new top 2D slice 330 including newly-collapsed bosses in a manner that may result in a substantially homogeneous new top 2D slice to accommodate a repeat of the boss forming and heat Stake joining process with a next new 2D slice.

The heat staking process is understood by those of skill in the art as a process that uses heat to deform the boss. The boss is deformed through a very localized softening of the boss to form a head that mechanically locks the top two 2D slices together in a quick, economical and consistent manner that does not translate heat to the rest of the structure. Heat staking is generally considered to have an advantage over other mechanical joining methods in eliminating a need for consumables, such as rivets and screws, and providing a substantially homogenous top 2D slice layer.

Figure 4:
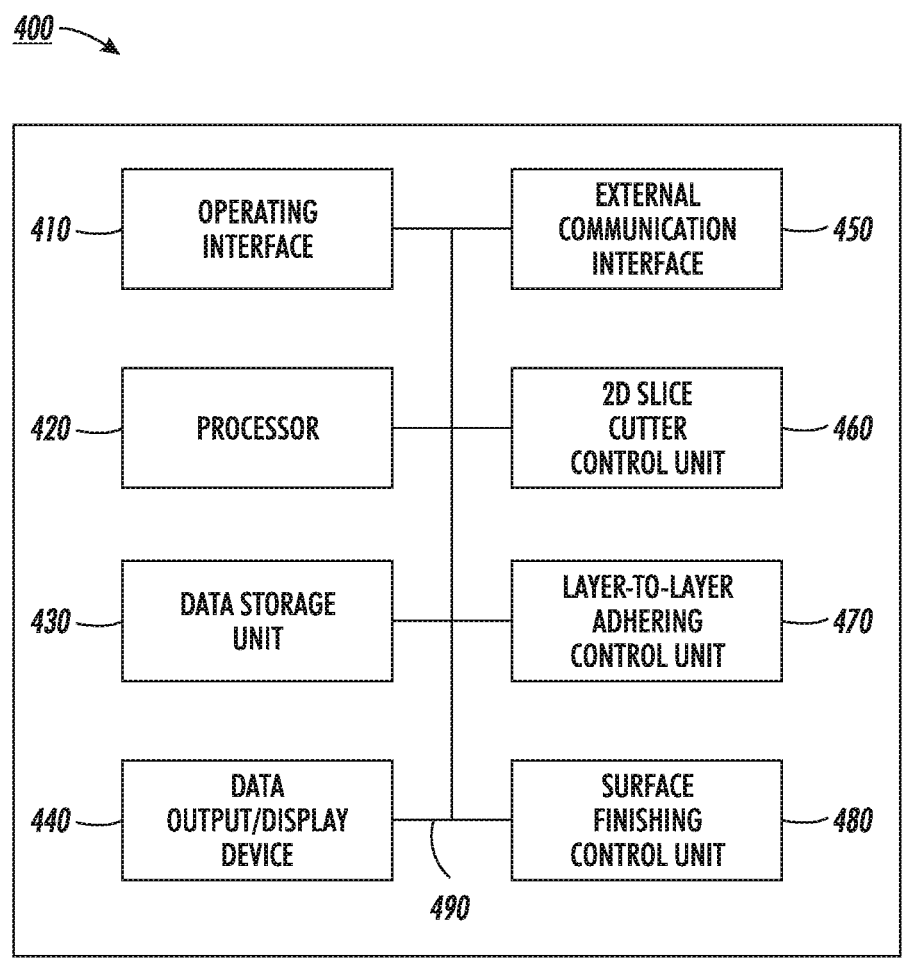
FIG. 4 illustrates a block diagram of an exemplary control system for implementing an AM manufacturing scheme including a comparatively low temperature layer to layer adhering technique in an in-process 3D object forming process according to this disclosure.

FIG. 4 illustrates a block diagram of an exemplary control system 400 for implementing an AM manufacturing scheme including a comparatively low temperature layer to layer adhering technique in an in-process 3D object forming process. The exemplary control system may provide input to or be a component of a controller for executing the AM manufacturing process in a system such as that depicted in FIG. 1.

The exemplary control system 400 may include an operating interface 410 by which a user may communicate with the exemplary control system 400. The operating interface 410 may be a locally-accessible user interface associated with an AM manufacturing or 3D object forming device. The operating interface 410 may be configured as one or more conventional mechanism common to control devices and/or computing devices that may permit a user to input information to the exemplary control system 400. The operating interface 410 may include, for example, a conventional keyboard, a touchscreen with "soft" buttons or with various components for use with a compatible stylus, a microphone by which a user may provide oral commands to the exemplary control system 400 to be "translated" by a voice recognition program, or other like device by which a user may communicate specific operating instructions to the exemplary control system 400. The operating interface 410 may be a part or a function of a graphical user interface (GUI) mounted on, integral to, or associated with, the AM manufacturing or 3D object forming device with which the exemplary control system 400 is associated.

The exemplary control system 400 may include one or more local processors 420 for individually operating the exemplary control system 400 and for carrying into effect control and operating functions for AM manufacturing or 3D object forming, and specifically for implementing a multi-stage 3D object forming scheme involving steps of laminate cutting (with lasers or other cutting devices); laminate transport between processing stations (including using one or more of conveyors, robotic pick and place devices and the like); laminate stacking, clamping and adhering through comparatively low temperature welding or other mechanical joining (including displacement/vibration welding or heat staking); and mechanical surface finishing (via CNC machining or other comparable process). Processor(s) 420 may include at least one conventional processor or microprocessor that interprets and executes instructions to direct specific functioning of the exemplary control system 400, and control of the AM manufacturing or 3D object forming process with the exemplary control system 400.

The exemplary control system 400 may include one or more data storage devices 430. Such data storage device(s) 430 may be used to store data or operating programs to be used by the exemplary control system 400, and specifically the processor(s) 420. Data storage device(s) 430 may be used to store information regarding, for example, one or more 3D object models for producing 3D objects in an AM manufacturing or 3D object forming device with which the exemplary control system 400 is associated. The stored 3D object model information may be devolved into data for the cutting of a series of slightly oversize 2D slices for forming the 3D object in the manner generally described above.

The data storage device(s) 430 may include a random access memory (RAM) or another type of dynamic storage device that is capable of storing updatable database information, and for separately storing instructions for execution of system operations by, for example, processor(s) 420. Data storage device(s) 430 may also include a read-only memory (ROM), which may include a conventional ROM device or another type of static storage device that stores static information and instructions for processor(s) 420. Further, the data storage device(s) 430 may be integral to the exemplary control system 400, or may be provided external to, and in wired or wireless communication with, the exemplary control system 400, including as cloud-based data storage components.

The exemplary control system 400 may include at least one data output/display device 440, which may be configured as one or more conventional mechanism that output information to a user, including, but not limited to, a display screen on a GUI of an AM manufacturing or 3D object forming device with which the exemplary control system 400 may be associated. The data output/display device 440 may be used to indicate to a user a status of an AM manufacturing or 3D object forming operation effected by the device with which the exemplary control system 400 may be associated including an operation of one or more individually controlled components at one or more of a plurality of separate processing stations in the device.

The exemplary control system 400 may include one or more separate external communication interfaces 450 by which the exemplary control system 400 may communicate with components external to the exemplary control system 400. At least one of the external communication interfaces 450 may be configured as an input port to support connection an external CAD/CAM device storing modeling information for execution of the control functions in the 3D object forming operations. Any suitable data connection to provide wired or wireless communication between the exemplary control system 400 and external and/or associated components is contemplated to be encompassed by the depicted external communication interface 450.

The exemplary control system 400 may include a 2D slice cutter control unit 460 that may be used to control the laminate cutter that produces the series of 2D slices for the in-process 3D object according to devolved 3D object modeling information. The 2D slice cutter control unit 460 may operate as a part or a function of the processor 420 coupled to one or more of the data storage devices 430, or may operate as a separate stand-alone component module or circuit in the exemplary control system 400. Either of the processor 420 or the 2D slice cutter control unit 460 itself may parse the input 3D object model information to determine and execute a layer-by-layer 2D slice material cutting scheme in the AM manufacturing or 3D object forming device.

The exemplary control system 400 may include a layer-to-layer adhering control unit 470 as a part or a function of the processor 420 coupled to one or more of the data storage devices 430, or as a separate stand-alone component module or circuit in the exemplary control system 400. The layer-to-layer adhering control unit 470 may be usable to control the functioning of one or more material deposition components for forming energy directors (in the case of displacement/vibration welding of individual 2D slices to one another) or printed bosses (in the case of heat staking of individual 2D slices to one another), and for executing the associated fixing/joining/adhering technique by which to join the individual 2D slices to one another according to the processes and techniques discussed in detail above.

The exemplary control system 400 may include a surface finishing control unit 480 for executing a final 3D object shaping scheme on a processed stack of cut and joined 2D slices in a subtractive machining process. As with the above-enumerated other separate control units, the surface finishing control unit 480 may operate as a part or a function of the processor 420 coupled to one or more data storage devices 430 for executing finishing device operations, or may operate as a separate stand-alone component module or circuit in the exemplary control system 400.

All of the various components of the exemplary control system 400, as depicted in FIG. 4, may be connected internally, and to one or more AM manufacturing or 3D object forming devices, by one or more data/control busses 490. These data/control busses 490 may provide wired or wireless communication between the various components of the exemplary control system 400, whether all of those components are housed integrally in, or are otherwise external and connected to an AM manufacturing or 3D object forming device with which the exemplary control system 400 may be associated.

It should be appreciated that, although depicted in FIG. 4 as an integral unit, the various disclosed elements of the exemplary control system 400 may be arranged in any combination of sub-systems as individual components or combinations of components, integral to a single unit, or external to, and in wired or wireless communication with the single unit of the exemplary control system 400. In other words, no specific configuration as an integral unit or as a support unit is to be implied by the depiction in FIG. 4. Further, although depicted as individual units for ease of understanding of the details provided in this disclosure regarding the exemplary control system 400, it should be understood that the described functions of any of the individually-depicted components, and particularly each of the depicted control units, may be undertaken, for example, by one or more processors 420 connected to, and in communication with, one or more data storage device(s) 430.

Figure 5A:
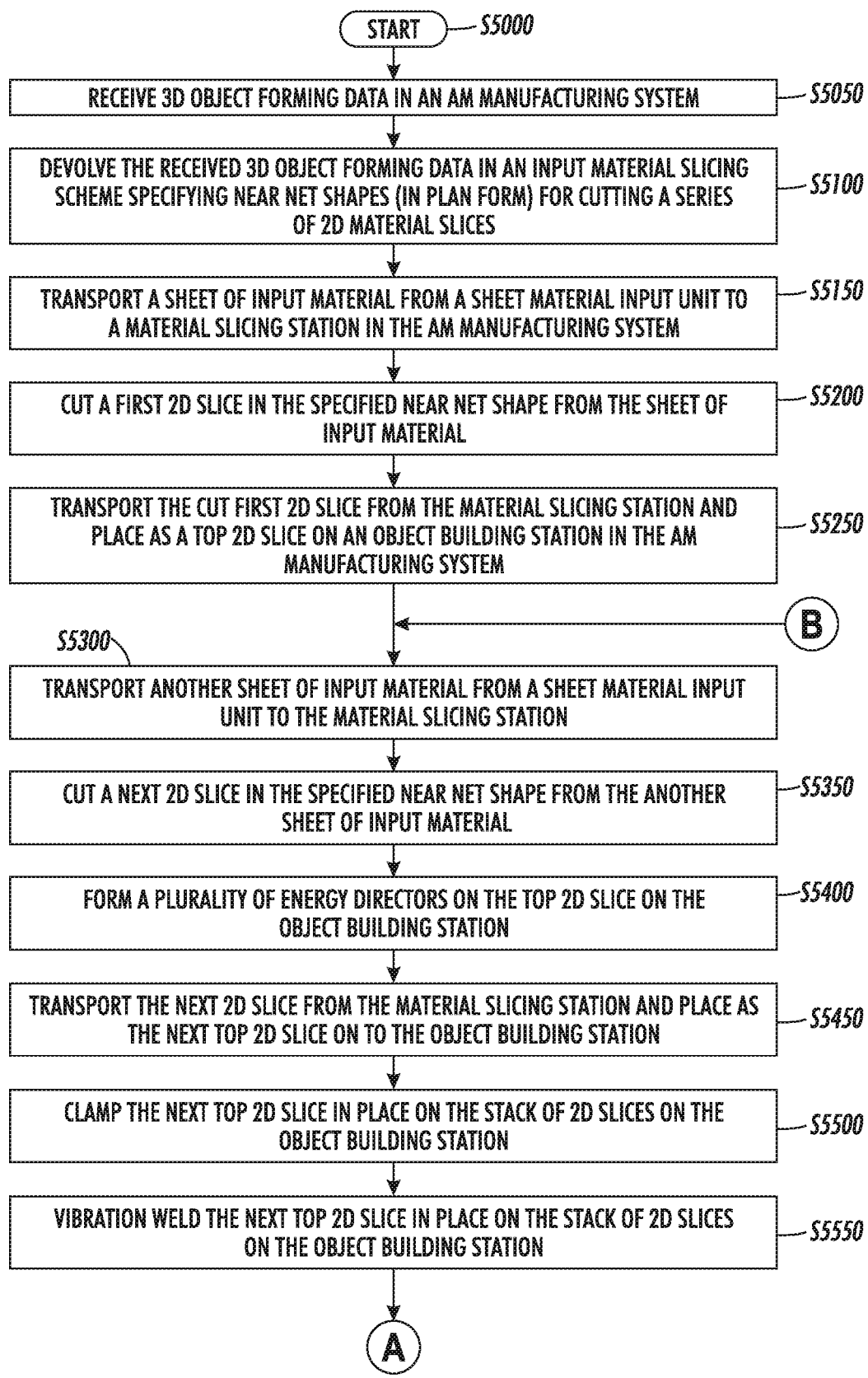
FIGS. 5A and 5B illustrate a flowchart of a first exemplary method for implementing an AM manufacturing scheme including a comparatively low temperature layer to layer adhering technique of displacement/vibration welding in an in-process 3D object forming process according to this disclosure.
Figure 5B:
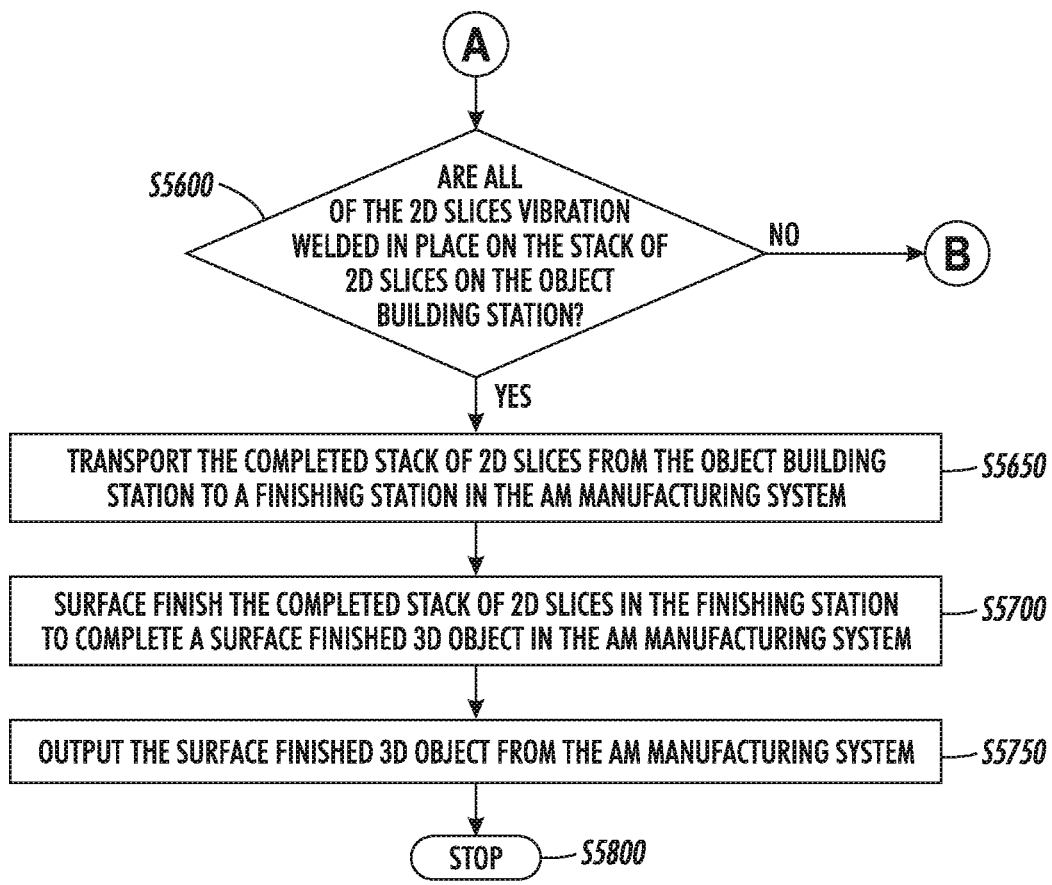
Figure 6A:
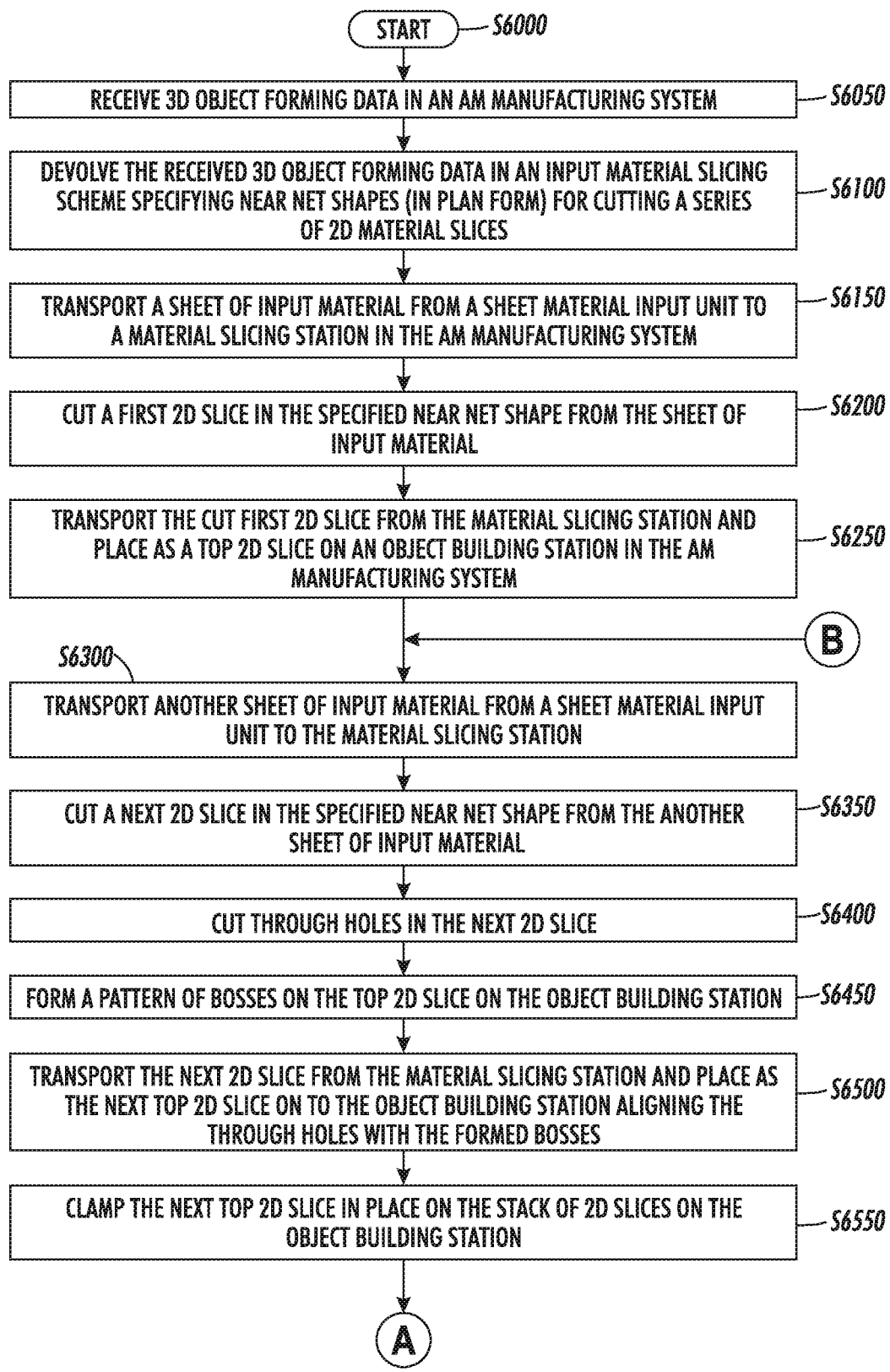
FIGS. 6A and 6B illustrate a flowchart of a second exemplary method for implementing an AM manufacturing scheme including a comparatively low temperature layer to layer adhering technique of heat staking in an in-process 3D object forming process according to this disclosure.
Figure 6B:
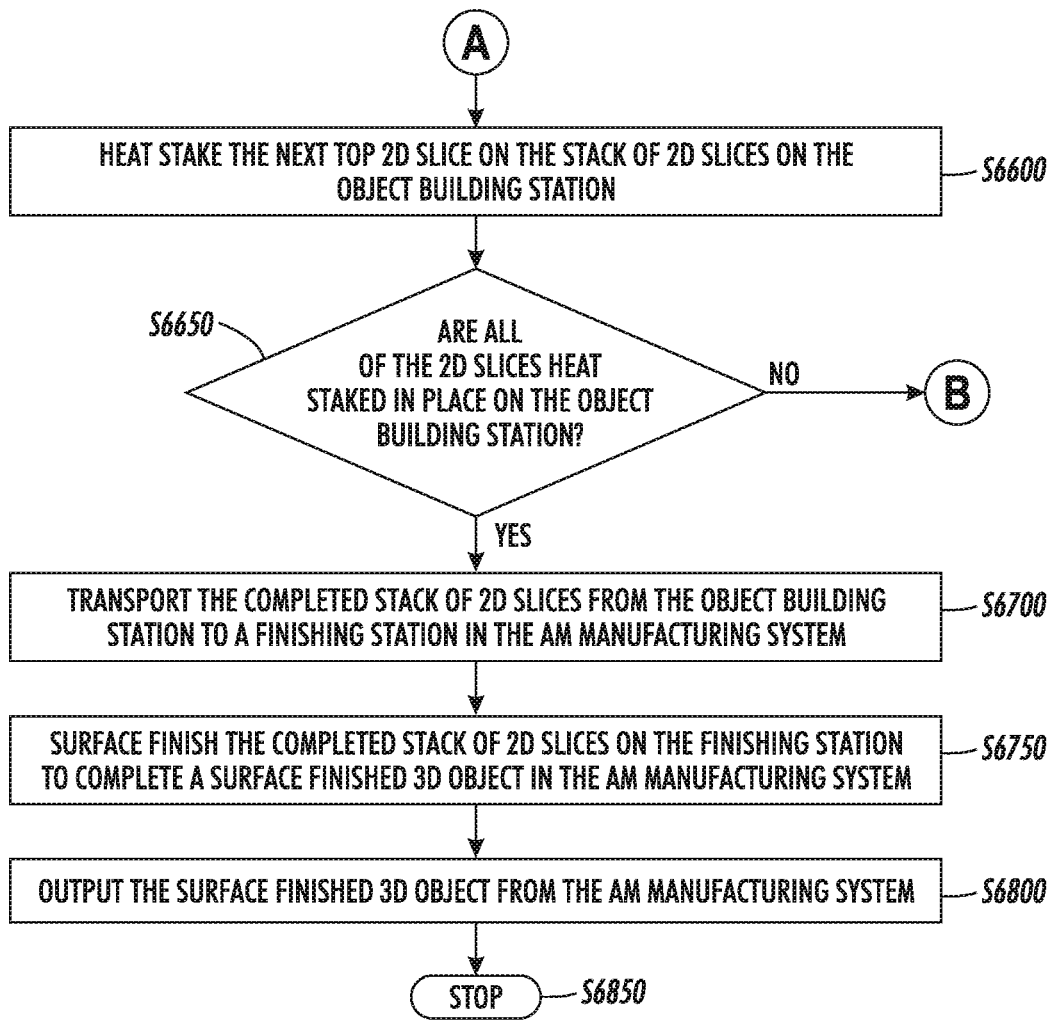

The disclosed embodiments may include exemplary methods for implementing AM manufacturing schemes for 3D object forming including comparatively low temperature layer to layer adhering techniques. FIGS. 5A and 5B illustrate a flowchart of such an exemplary method for a comparatively low temperature layer to layer adhering technique of displacement/vibration welding. FIGS. 6A and 6B illustrate a flowchart of a second exemplary method for a comparatively low temperature layer to layer adhering technique of heat staking. Because the steps of the methods include several similar steps, they will be taken together. As shown in FIGS. 5A and 5B, and 6A and 6B, operation of the methods commence at Step S5000/6000 and proceed to Step S5050/6050.

In Step S5050/6050, 3D object forming data may be received from a data source in an AM manufacturing system. Operation of the method proceeds to Step S5100/6100.

In Step S5100/6100, the received 3D object forming data may be devolved, parsed or otherwise converted into an input material slicing scheme. The input material slicing scheme may specify near net shapes (in plan form) for cutting a series of 2D material slices from sheets of input material with a 2D material cutting device. Operation of the method proceeds to Step S5150/6150.

In Step S5150/6150, a sheet of input material may be transported from a sheet material input unit, including a material cassette storing stacked or rolled sheets of input material, to a material slicing station in the AM manufacturing system. Operation of the method proceeds to Step S5200/6200.

In Step S5200/6200, a first 2D slice may be cut in the specified near net shape (in plan form) from the sheet of input material presented to the material slicing station. Operation of the method proceeds to Step S5250/6250.

In Step S5250/6250, the cut first 2D slice may be transported from the material slicing station and placed as a top 2D slice on a build platform of an object building station in the AM manufacturing system. Operation of the method proceeds to Step S5300/6300.

In Step S5300/6300, another sheet of input material may be transported from the sheet material input unit to the material slicing station, as necessary, in the AM manufacturing system. Operation of the method proceeds to Step S5350/6350.

In Step S5350/6350, the next 2D slice may be cut in the specified near net shape from the presented sheet of input material, or the presented another sheet of input material as appropriate. Operation of the method proceeds to Step S5400/6400.

In Step S5400, in support of the displacement/vibration welding method, a plurality of energy directors may be formed (or printed) on a top 2D slice on the object building station in the AM manufacturing system. Operation of the method proceeds to Step S5450.

In Step S6400, in support of the heat staking method, additional through hole features may be cut in the next 2D slice to accommodate a pattern of bosses to be formed on an underlying in-place 2D slice positioned on the build platform. Operation the method proceeds to Step 6450.

In Step S6450, in the heat staking method, a pattern of bosses may be formed or printed on a top 2D slice on the object building station in the AM manufacturing system. Operation of the method proceeds to Step S6500.

In Step S5450/6500, the cut next 2D slice may be transported from the material slicing station and placed as the next top 2D slice on the object building station. In the heat staking method, the through holes in the cut next 2D slice are aligned with the formed pattern of bosses. Operation of the method proceeds to Step S5500/6550.

In Step S5500/6550, the next top 2D slice may be clamped in place on the top of the stack of 2D slices on the object building station in the AM manufacturing system. Operation the method proceeds to Step S5550/6600.

In Step S5550, in the displacement/vibration welding method, the next top 2D slice may be displacement/vibration welded in place on the stack of 2D slices on the object building station in the AM manufacturing system according to known methods in a manner that reduces any differential height of the energy directors placed between the 2D slices. Operation of the method proceeds to Step S5600.

In Step S6600, in the heat staking method, the formed bosses may be heat staked to adhere the next top 2D slice onto the stack of 2D slices on the object building station in the AM manufacturing system. Operation the method proceeds to Step S6650.

Step S5600/6650 is a determination step in which it is determined whether all of the 2D slices specified by the received 3-D object forming data are displacement/vibration welded, or heat staked, in place on the stack of the 2D slices on the object building station in the AM manufacturing system to form a near net shape 3D object of cut and adhered 2D slices.

If in Step S5600/6650 it is determined that all of the 2D slices of the in-process 3D object have not been displacement/vibration welded, or heat staked, in place, operation of the method reverts to Step S5300/6300.

If in Step S5600/6650 it is determined that all of the 2D slices of the in-process 3D object have been displacement/vibration welded, or heat staked, in place, operation of the method proceeds to Step S5650/6700.

In Step S5650/6700, the completed stack of 2D slices may be transported from the object building station to a finishing station in the AM manufacturing system. Operation the method proceeds to Step S5700/6750.

In Step S5700/6750, the completed stack of 2D slices may be surface finished in a subtractive material machining method to final form the near net shape stack of 2D slices into a surface finished 3D object in the AM manufacturing system. Operation the method proceeds to Step S5750/6800.

In Step S5750/6800, the formed and surface finished 3D object may be output from the AM manufacturing system. Operation of the method proceeds to Step S5800/6850, where operation of the method ceases.

As indicated above, the method may positively provide a previously unachievable level of speed in the build process for fabricating a finished output 3D object formed in the AM manufacturing system.

The disclosed embodiments may include a non-transitory computer-readable medium storing instructions which, when executed by a processor, may cause the processor to execute all, or at least some, of the steps of the methods outlined above.

The above-described exemplary systems and methods reference certain conventional components to provide a brief, general description of suitable operating, product processing and 3D object forming or AM manufacturing environments in which the subject matter of this disclosure may be implemented for familiarity and ease of understanding. Although not required, embodiments of the disclosure may be provided, at least in part, in a form of hardware circuits, firmware, or software computer-executable instructions to carry out the specific functions described. These may include individual program modules executed by processors.

Those skilled in the art will appreciate that other embodiments of the disclosed subject matter may be practiced in AM manufacturing devices, including various additive and subtractive manufacturing methods, of many different configurations.

As indicated above, embodiments within the scope of this disclosure may include computer-readable media having stored computer-executable instructions or data structures that can be accessed, read and executed by one or more processors for controlling the disclosed AM manufacturing schemes. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures for carrying into effect those executable instructions represent one example of a corresponding sequence of acts for implementing the functions described in the steps of the above-outlined exemplary methods. The exemplary depicted steps may be executed in any reasonable order to carry into effect the objectives of the disclosed embodiments. No particular order to the disclosed steps of the methods is necessarily implied by the depictions in FIGS. 5A and 5B, and 6A and 6B, except where a particular method step is a necessary precondition to execution of any other method step.

Although the above description may contain specific details, they should not be construed as limiting the claims in any way. Other configurations of the described embodiments of the disclosed systems and methods are part of the scope of this disclosure.

It will be appreciated that various of the above-disclosed and other features and functions, or alternatives thereof, may be desirably combined into many other different systems or applications. Also, various alternatives, modifications, variations or improvements therein may be subsequently made by those skilled in the art which are also intended to be encompassed by the following claims.

We claim:

1. An object manufacturing system, comprising:
a laminate cutter for cutting two-dimensional (2D) slices from sheets of material, each of the 2D slices constituting an individual layer among a plurality of layers forming an in-process three-dimensional (3D) object;
a transport mechanism for transporting each of the cut 2D slices from the laminate cutter to a 3D object build platform to form the plurality of layers of the in-process 3D object;
a layer-to-layer adhering unit associated with the 3D object build platform that executes a layer-to-layer adhering process for affixing each of the 2D slices in sequence to form the plurality of layers of the in-process 3D object, the layer-to-layer adhering unit configured to execute at least one of a displacement welding and vibration welding process in which energy directors are applied between pairs of 2D slices and the pairs of 2D slices are the at least one of a displacement welded and vibration welded together at the positions of the energy directors; and
a surface finishing device that surface finishes the in-process 3D object to produce a finished 3D object.

2. The system of claim 1, further comprising a processor configured to:

reference 3D object modeling data;
parse the referenced 3D object modeling data into instructions for controlling the laminate cutter for cutting each of the 2D slices from the sheets of material;
control a layer by layer 2D slice cutting, transporting and adhering process to produce the in-process 3D object from the plurality of layers; and
control the surface finishing device to finish the surface of the in-process 3D object.

3. The system of claim 2, further comprising a data storage memory medium storing the 3D object modeling data for reference by the processor.

4. The system of claim 1, further comprising a material input source that stores the sheets of material as one of a stack of the sheets and a roll of the sheets.

5. The system of claim 1, the laminate cutter comprising one of a laser cutter, a mechanical milling cutter, a mechanical blade cutter and a watejet cutter.

6. The system of claim 1, the transport mechanism comprising a robotic pick and place device.

7. The system of claim 1, the surface finishing device comprising a multi-axis Computer Numerical Control (CNC) milling machine.

8. The system of claim 1, the energy directors being applied in one of a fused deposition modelling and a multi-jet modelling process.

9. An object manufacturing system, comprising:
a laminate cutter for cutting two-dimensional (2D) slices from sheets of material, each of the 2D slices constituting an individual layer among a plurality of layers forming an in-process three-dimensional (3D) object;
a transport mechanism for transporting each of the cut 2D slices from the laminate cutter to a 3D object build platform to form the plurality of layers of the in-process 3D object;
a layer-to-layer adhering unit associated with the 3D object build platform that executes a layer-to-layer adhering process for affixing each of the 21) slices in sequence to form the plurality of layers of the in-process 3D object, the layer-to-layer adhering unit configured to execute a heat staking process in which (1) a plurality of bosses are formed on a first 2D slice, (2) a plurality of cooperating through features are cut in a second 2D slice, (3) the first 2D slice and the second 2D slice are brought together on the 3D object build platform in a manner that the plurality of bosses protrude through the plurality of through features; and (4) and pressure is applied to the bosses to heat stake the first and second 2D slices together; and
a surface finishing device that surface finishes the in-process 3D object to produce a finished 3D object.

10. The system of claim 9, the plurality of bosses being applied in one of a fused deposition modelling and a multi-jet modelling process.

11. The system of claim 1, the sheets of material being formed of a thermoplastic.

12. A non-transitory computer readable medium storing instructions that, when executed by a processor, cause the processor to execute the steps of a method for forming an object, the method comprising:
cutting two-dimensional (2D) slices from sheets of material with a laminate cutter, each of the 2D slices constituting an individual layer among a plurality of layers forming an in-process three-dimensional (3D) object;
transporting each of the cut 2D slices from the laminate cutter to a 3D object build platform with a transport mechanism to form the plurality of layers of the in-process 3D object on the build platform;

executing a layer-to-layer adhering process with a layer-to-layer adhering unit associated with the 3D object build platform that affixes each of the 2D slices in sequence to form the plurality of layers of the in-process 3D object, the layer-to-layer adhering process comprising at least one of a displacement welding and vibration welding process in which energy directors are applied between pairs of 2D slices and the pairs of 2D slices are the at least one of a displacement welded and vibration welded together at the positions of the energy directors; and surface finishing the in-process 3D object to produce a finished 3D object.

13. The non-transitory computer readable medium of claim 12, the layer-to-layer adhering process further comprising applying the energy directors in one of a fused deposition modelling and a multi-jet modelling process.

14. The non-transitory computer readable medium of claim 12, the layer-to-layer adhering process comprising a heat staking process in which (1) a plurality of bosses are formed on a first 2D slice, (2) a plurality of cooperating through features are cut in a second 2D slice, (3) the first 2D slice and the second 2D slice are brought together on the 3D object build platform in a manner that the plurality of bosses protrude through the plurality of through features; and (4) and pressure is applied to the bosses to heat stake the first and second 2D slices together.

15. The non-transitory computer readable medium of claim 14, the processor-controlled layer-to-layer adhering process further comprising applying the plurality of bosses in one of a fused deposition modelling and a multi-jet modelling process.

16. The non-transitory computer readable medium of claim 12, wherein the processor is configured to:
reference 3D object modeling data;
parse the referenced 3D object modeling data into instructions for controlling the laminate cutter for cutting each of the 2D slices from the sheets of material;
control a layer by layer 2D slice cutting, transporting and adhering process to produce the in-process 3D object from the plurality of layers; and
control the surface finishing device to finish the surface of the in-process 3D object.

17. The system of claim 9, further comprising a processor configured to:
reference 3D object modeling data;
parse the referenced 3D object modeling data into instructions for controlling the laminate cutter for cutting each of the 2D slices from the sheets of material;
control a layer by layer 2D slice cutting, transporting and adhering process to produce the in-process 3D object from the plurality of layers; and
control the surface finishing device to finish the surface of the in-process 3D object.

18. The system of claim 9, further comprising a material input source that stores the sheets of material as one of a stack of the sheets and a roll of the sheets.

19. The system of claim 9, the laminate cutter comprising one of a laser cutter, a mechanical milling cutter, a mechanical blade cutter and a waterjet cutter.

20. The system of claim 9, the transport mechanism comprising a robotic pick and place device.

* * * * *